United States Patent
Kim et al.

(10) Patent No.: US 7,541,768 B2
(45) Date of Patent: Jun. 2, 2009

(54) STEP MOTOR CONTROL CIRCUIT AND METHOD OF GENERATING STEP MOTOR CONTROL SIGNAL

(75) Inventors: Soo-yong Kim, Suwon-si (KR); Yong-ha Hwang, Seongnam-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 146 days.

(21) Appl. No.: 11/585,258

(22) Filed: Oct. 24, 2006

(65) Prior Publication Data

US 2007/0096679 A1    May 3, 2007

(30) Foreign Application Priority Data

Nov. 3, 2005    (KR) ............ 10-2005-0105064

(51) Int. Cl.
*H02P 8/00* (2006.01)
(52) U.S. Cl. ............ 318/696; 318/685; 318/503
(58) Field of Classification Search ......... 318/696, 318/685, 503, 504, 822, 453, 472, 473
See application file for complete search history.

(56) References Cited

U.S. PATENT DOCUMENTS 4,050,017 A * 9/1977 Paufve .................. 324/72.5
2004/0027186 A1* 2/2004 Teterud ................. 327/309
2005/0046400 A1* 3/2005 Rotem .................. 323/234

FOREIGN PATENT DOCUMENTS

| JP | 11-259875 | 9/1999 |
|---|---|---|
| KR | 10-2001-0027613 | 4/2001 |
| KR | 10-2004-0017874 | 3/2004 |
| KR | 10-2005-0060603 | 6/2005 |

* cited by examiner

*Primary Examiner*—Karen Masih
(74) *Attorney, Agent, or Firm*—Lee & Morse, P.C.

(57) ABSTRACT

A step motor control circuit that does not fix a reference voltage of a step motor control signal. The step motor control circuit may include a digital-to-analog (DAC) signal generator configured to generate first and second DAC signals in response to a step motor error signal, a gain adjust block configured to control gains of the first and second DAC signals in response to a control signal and output first and second step motor control signals, and a gain controller configured to output the control signal in response to a mode signal and a gain control signal, in which the first and second step motor control signals are pulse trains including a reference voltage, and the reference voltage may be a fixed voltage when the mode signal indicates a normal mode and the reference voltage may be a variable voltage when the mode signal indicates a power consumption reduction mode.

20 Claims, 3 Drawing Sheets

US 7,541,768 B2

STEP MOTOR CONTROL CIRCUIT AND METHOD OF GENERATING STEP MOTOR CONTROL SIGNAL

BACKGROUND OF THE INVENTION

1. Field of the Invention

The present invention relates to driving a step motor. More particularly, the present invention relates to driving a step motor in a low power consumption mode.

2. Description of the Related Art

Step motors may be used in paper outputting devices, such as printers or facsimiles, heads of floppy disks, optical disk devices, micro-mouses, industrial robot arms, etc., since they can accurately control speeds or locations.

Information on current location and movement location of an object may be used to drive step motors. This information may include coordinate values of the current and movement locations of the object. Step motors may use two control signals when the object moves in a 2-dimensional space.

FIG. 1 is a graph illustrating two signals driving a step motor. Referring to FIG. 1, two coordinate values may be used to drive the step motor. The two coordinate values may correspond to points where a sine wave and a cosine wave overlap. A first coordinate value may be used to move an object. The first coordinate value may be a point on the sine wave. The second coordinate value may be a point on the cosine wave corresponding to the first coordinate. For example, two pairs of coordinate information P1 and P2, and P3 and P4, respectively, may be used to drive the step motor. The step motor may detect differences between a current location and a movement location of an object which allows the object to arrive at a final destination using the detected information.

The difference information may be considered error information. When the error signal falls within a predetermined offset, a system stops supplying power to a circuit driving the step motor during a predetermined period of time so as to reduce power consumption. For example, when a system reads information stored on an optical disk, a lens may perform tracking along the optical disk storing the information. In this regard, an excessive action of a servo is not required, i.e., the tracking operation falls within the predetermined offset, according to the status of the optical disk or an optical disk apparatus. Thus, supplying power to the circuit driving the step motor under these circumstances may result in unnecessary power consumption.

FIG. 2 is a graph illustrating two signals driving the step motor to reduce power consumption. Referring to FIG. 2, a bold-lined signal may be used in a normal state, and a thin-lined pulse signal may be used to reduce power consumption. The sine wave illustrated in FIG. 2 will now be described in relation to FIG. 1. The thin-lined pulse signal may include a pulse train based on a reference voltage $V_{ref}$. The reference voltage $V_{ref}$ has a DC value. The period of time where the thin-lined pulse signal meets the bold-lined signal indicates the size or amplitude of a pulse. Accordingly, the maximum and minimum values of the pulse is VP(+) and VP(−). Thus, the thin-lined pulse signal may rapidly vary according to differences between the reference voltage $V_{ref}$ and the bold-lined signal. The voltage variation of the thin-lined pulse signal is $\{VP(+)-V_{ref}\}$ or $\{V_{ref}-VP(-)\}$. However, this voltage variation may deteriorate the operation of the step motor and negatively affect peripheral circuits.

SUMMARY OF THE INVENTION

The present invention is therefore directed to a step motor control circuit and a method of generating step motor control signals, which substantially overcome one or more of the problems due to the limitations and disadvantages of the related art.

It is therefore a feature of an embodiment of the present invention to provide a step motor control circuit configured to generate a step motor control signal having either a fixed reference voltage, such as a DC voltage, or a variable reference voltage.

It is therefore a feature of an embodiment of the present invention to provide a method of generating a step motor control signal that includes either a fixed reference voltage, such as a DC voltage, or a variable reference voltage.

At least one of the above and other features and advantages of the present invention may be realized by providing a step motor control circuit including a digital-to-analog converter (DAC) signal generator configured to generate first and second DAC signals in response to a step motor error signal, a gain adjust block configured to control gains of the first and second DAC signals in response to a control signal and configured to output first and second step motor control signals, and a gain controller configured to output the control signal in response to a mode signal and a gain control signal, in which the first and second step motor control signals are pulse trains each including a reference voltage, in which the reference voltage may be a fixed voltage when the mode signal is in a normal mode or a variable voltage when the mode signal is in a power consumption reduction mode.

The fixed voltage may be a predetermined DC voltage and the variable voltage may be a voltage in the form of a sine wave or a cosine wave, where the first step motor control signal may include a reference voltage that is the predetermined DC voltage or the voltage in the form of the sine wave, and the second step motor control signal may include a reference voltage that is the DC voltage or the voltage in the form of the cosine wave.

The step motor error signal may be a differential signal including information on a difference between a current location of a moving object by a step motor and a movement location of the object to be moved, or the step motor error signal may be a signal including information on the movement of the object and generated using the differential signal.

The mode signal may indicate the power consumption reduction mode when the step motor error signal falls within an offset and may indicate the normal mode when the step motor error signal falls outside the offset.

The first and second DAC signals may include information on the location of the object in a 2-dimensional space to be moved using the step motor.

The DAC signal generator may include look-up tables, the look-up tables may include information on the first and second DAC signals, where the DAC signal generator may be configured to obtain information on the step motor error signal from the look-up tables and generate the first and second DAC signals based on the obtained information.

The look-up tables may include a first look-up table including information on the first DAC signal, and a second look-up table including information on the second DAC signal.

The gain control block may include a first gain stage configured to control the gain of the first DAC signal in response to the control signal and output the first step motor control signal, and a second gain stage configured to control the gain of the second DAC signal in response to the control signal and output the second step motor control signal.

The control of the gain of the first DAC signal may be controlling an amplitude of a sine wave based on the first DAC signal, and the control of the gain of the second DAC signal may be controlling an amplitude of a cosine wave based on the second DAC signal.

The gain control signal may include information for controlling the gain of the first and second DAC signals.

At least one of the above and other features and advantages of the present invention may be realized by providing a step motor control circuit including a step motor control signal generator configured to generate first and second step motor control signals in response to a step motor error signal and a control signal, and a gain controller configured to output the control signal in response to a mode signal and a gain control signal, where the first and second step motor control signals are pulse trains including a reference voltage, the reference voltage may be a fixed voltage when the mode signal is in a normal mode and the reference voltage may be a variable voltage when the mode signal is in a power consumption reduction mode.

The fixed voltage may be a predetermined DC voltage, and the variable voltage may be a voltage in the form of a sine wave or a cosine wave, where the first step motor control signal includes a reference voltage that is the predetermined DC voltage or the voltage in the form of the sine wave and the second step motor control signal includes a reference voltage that is the predetermined DC voltage or the voltage in the form of the cosine wave.

The step motor error signal may be a differential signal including information on a difference between a current location of a moving object by a step motor and a movement location of the object to be moved, or the step motor error signal may be a signal including information on the movement of the object and generated using the different signal.

The mode signal may indicate the power consumption reduction mode when the step motor error signal falls within an offset and may indicate the normal mode when the step motor error signal falls outside the offset.

The first and second step motor control signals may include information on the location of the object in a 2-dimensional space to be moved using the step motor.

The step motor control signal generator may include look-up tables, the look-up tables including information on the first and second step motor control signals, where the step motor control signal generator may be configured to obtain information on the step motor error signal from the look-up tables and generate the first and second step motor control signals based on the obtained information.

The look-up tables may include a first look-up table that includes information on the first step motor control signal, and a second look-up table that includes information on the second step motor control signal.

The gain control signal may include information on the amplitude of the variable voltage.

At least one of the above and other features and advantages of the present invention may be realized by providing a method of generating a step motor control signal, including determining a reference voltage of a step motor control signal operating a step motor as a fixed voltage when the step motor is operated in a normal mode, and determining the reference voltage of the step motor control signal as a variable voltage when the step motor is operated in a power consumption reduction mode, and generating first and second step motor control signals that are pulse trains, wherein the first and second step motor control signals each include a determined reference voltage.

The method further including selecting the power consumption reduction mode when the step motor error signal falls within an offset, and selecting the normal mode when the step motor error signal falls outside the offset, where the step motor error signal may be a differential signal including information on a difference between a current location of a moving object by a step motor and a movement location of the object to be moved, or the step motor error signal may be a signal including information on the movement of the object and generated using the differential signal.

The method further including the fixed voltage may be a predetermined DC voltage and the variable voltage may be a voltage in the form of a sine wave or a cosine wave, where the first step motor control signal is a pulse train that includes a reference voltage that is the predetermined DC voltage or the voltage in the form of the sine wave, wherein the second step motor control signal is a pulse train that includes a reference voltage that is the predetermined DC voltage or the voltage in the form of the cosine wave.

BRIEF DESCRIPTION OF THE DRAWINGS

The above and other features and advantages of the present invention will become more apparent to those of ordinary skill in the art by describing in detail exemplary embodiments thereof with reference to the attached drawings, in which.

DETAILED DESCRIPTION OF THE INVENTION

Figure 1:
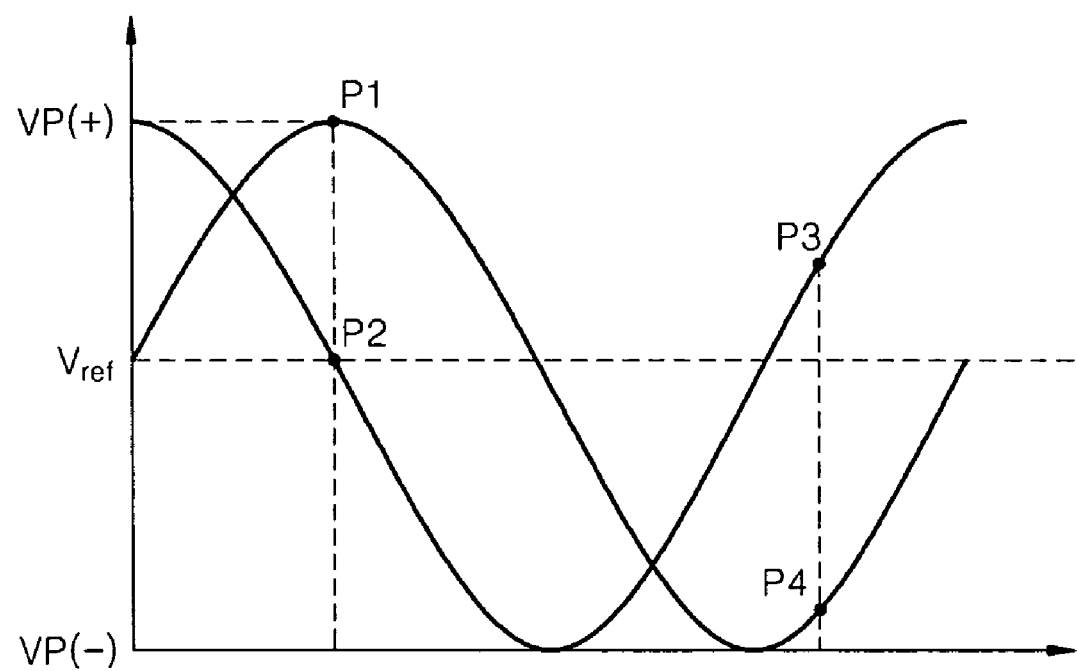
FIG. 1 is a graph illustrating two signals driving a step motor.

Korean Patent Application No. 10-2005-0105064, filed on Nov. 3, 2005, in the Korean Intellectual Property Office, and entitled: "Step Motor Control Circuit and Method of Generating Step Motor Control Signal," is incorporated by reference herein in its entirety.

The present invention will now be described more fully hereinafter with reference to the accompanying drawings, in which exemplary embodiments of the invention are illustrated. The invention may, however, be embodied in different forms and should not be construed as limited to the exemplary embodiments set forth herein. Rather, these exemplary embodiments are provided so that this disclosure will be thorough and complete, and will fully convey the scope of the invention to those skilled in the art. Like reference numerals refer to like elements throughout.

Figure 2:
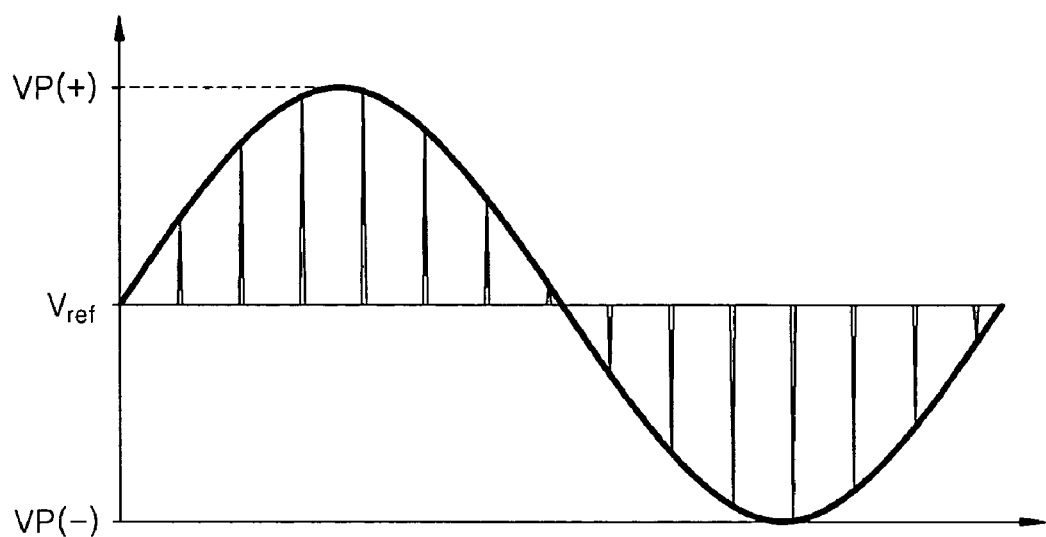
FIG. 2 is a graph illustrating two signals driving the step motor to reduce power consumption.
Figure 3:
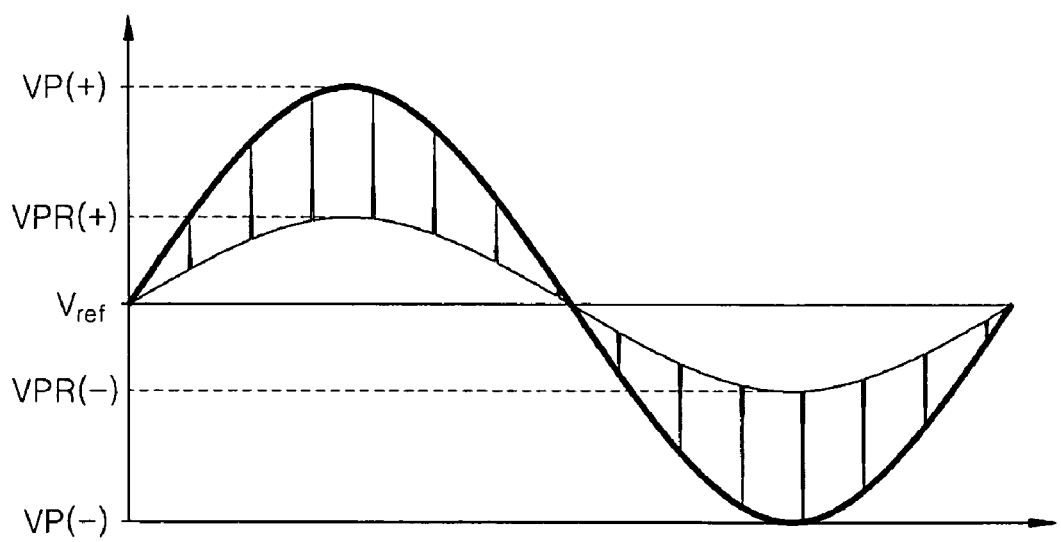
FIG. 3 is a graph illustrating a step motor control signal generated in a step motor control circuit according to an exemplary embodiment of the present invention.

FIG. 3 is a graph illustrating a step motor control signal generated in a step motor control circuit according to an exemplary embodiment of the present invention. Referring to FIG. 3, a bold-lined sine wave may be a signal used in a normal state and a thin-lined pulse train may be a step motor control signal for reducing power consumption. However, a reference voltage $V_{ref}$ of the pulse train, which may be the step motor control signal, is not a conventional DC voltage. Rather the reference voltage $V_{ref}$ of the pulse train may be, for example, a sinusoidal voltage. A pulse indicates a difference in electric potential between the reference voltage and a peak point. Therefore, each pulse may have a maximum value of {VP(+)−VPR(+)}, which may be smaller than the maximum value of the pulse VP(+) illustrated in FIG. 2. The values (VPR(+), VPR(−)) of the sine wave may be arbitrarily varied to reduce instability of a system caused by the reduction of power consumption.

A step motor control circuit that generates the step motor control signal illustrated in FIG. 3 will now be described.

Figure 4:
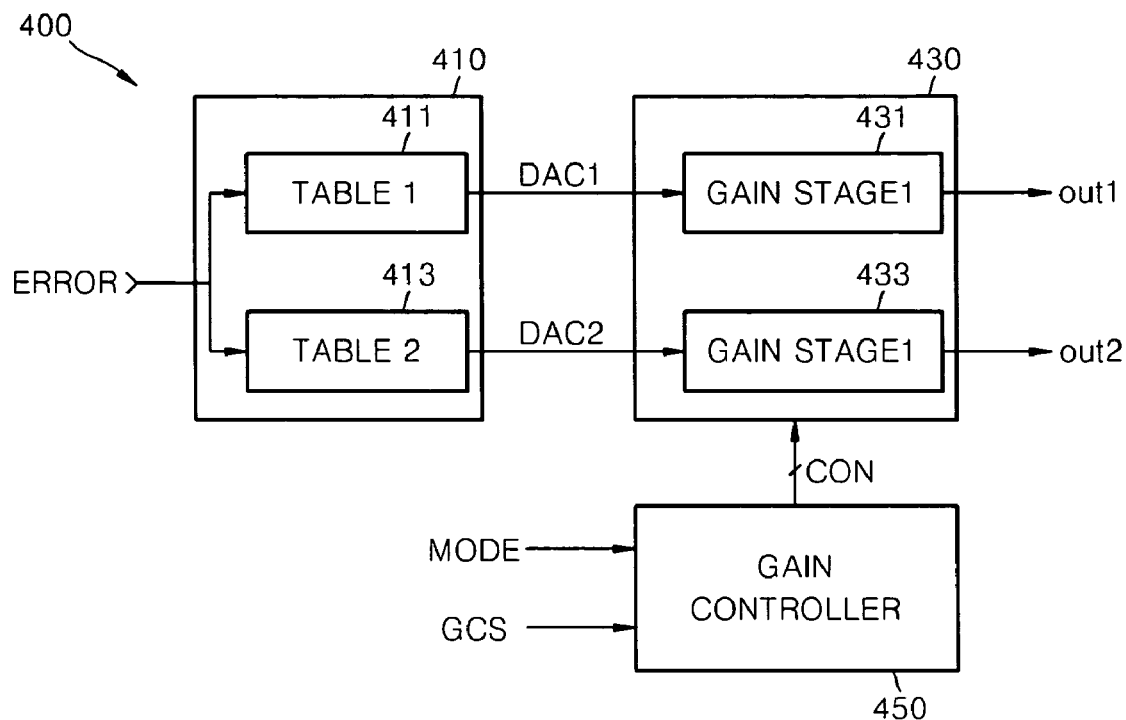
FIG. 4 is a block diagram illustrating a step motor control circuit according to an exemplary embodiment of the present invention.

FIG. 4 is a block diagram illustrating a step motor control circuit 400 according to an exemplary embodiment of the present invention. Referring to FIG. 4, the step motor control circuit 400 may include a DAC signal generator 410, a gain control block 430, and a gain controller 450.

The step motor error signal ERROR may be a differential signal including information on a difference between a current location of the object to be moved by the step motor and a movement location of the object. Alternately, the step motor error signal ERROR may be a signal that includes information on the movement of the object and may be generated using the differential signal.

The DAC signal generator 410 may include, for example, two look-up tables 411 and 413. The DAC signal generator 410 may obtain information on the step motor error signal ERROR from the look-up tables 411 and 413 and may generate two DAC signals DAC1 and DAC2 based on the obtained information. For example, the first look-up table 411 may include information relating to the first DAC signal DAC1, and the second look-up table 413 may include information relating to the second DAC signal DAC2. The first and second DAC signals DAC1 and DAC2 may include information on the location of an object in 2-dimensional space to be moved using a step motor.

The gain control block 430 may include two gain stages 431 and 433 to control the gain of the first and second DAC signals DAC1 and DAC2 in response to a control signal CON. The gain control block may output first and second step motor control signals OUT1 and OUT2. That is, the first gain stage 431 may control the gain of the first DAC signal DAC1 in response to the control signal CON and output the first step motor control signal OUT1, and the second gain stage 433 may control the gain of the second DAC signal DAC2 in response to the control signal CON and output the second step motor control signal OUT2. A further discussion relating to the first and second step motor control signals OUT1 and OUT2 and a control signal CON is found below.

The gain controller 450 may output a control signal CON in response to a mode signal MODE and a gain control signal GCS. The mode signal MODE may indicate a normal mode or a power consumption reduction mode. The mode signal MODE may indicate a power consumption reduction mode or a normal mode. More particularly, the mode signal MODE may indicate a power consumption mode when the step motor error signal ERROR falls within an offset, or a normal mode when the step motor error signal ERROR falls outside the offset. The gain control signal GCS may include information for controlling the gain of the first and second DAC signals DAC1 and DAC2.

The first and second step motor control signals OUT1 and OUT2 may be pulse trains where a fixed voltage is a reference voltage of the pulse train when the mode signal MODE indicates the normal mode and a variable voltage is the reference voltage of the pulse train when the mode signal MODE indicates the power consumption reduction mode. The variable voltage may be in the form of a sine wave or a cosine wave. That is, the reference voltage of the pulse trains may be a sine wave voltage or a cosine wave voltage. For example, a sine wave voltage may be based on the first DAC signal DAC1, and a cosine wave voltage may be based on the second DAC signal DAC2. Hence, as discussed above, controlling the gain of the first DAC signal DAC1 and the second DAC signal DAC2 indicates controlling the amplitude of the sine and cosine waves.

Figure 5:
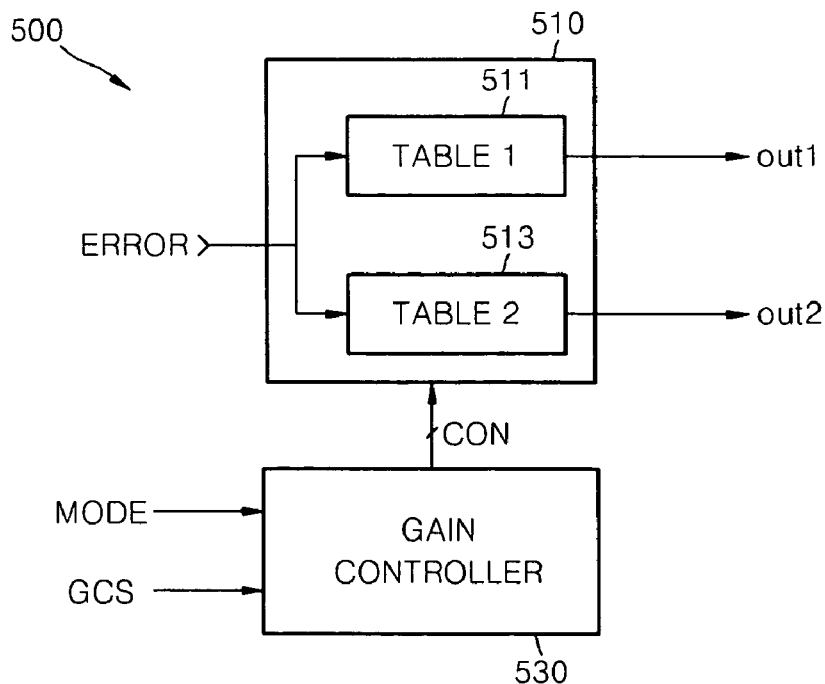
FIG. 5 is a block diagram illustrating a step motor control circuit according to another exemplary embodiment of the present invention.

FIG. 5 is a block diagram illustrating a step motor control circuit 500 according to another embodiment of the present invention. Referring to FIG. 5, the step motor control circuit 500 may include a step motor control signal generator 510 and a gain controller 530.

The step motor error signal ERROR may be a differential signal including information on a difference between a current location of the object to be moved by the step motor and a movement location of the object. Alternately, the step motor error signal ERROR may be a signal that includes information on the movement of the object and may be generated using the differential signal.

The step motor control signal generator 510 may include, for example, first and second look-up tables 511 and 513. The step motor control signal generator 510 may obtain information on a step motor error signal ERROR and a control signal CON from the first and second look-up tables 511 and 513. The step motor control signal generator 510 may output first and second step motor control signals OUT1 and OUT2.

The first and second step motor control signals OUT1 and OUT2 may be pulse trains in which a fixed voltage is a reference voltage of the pulse train when the mode signal MODE indicates a normal mode and a variable voltage is the reference voltage of the pulse train when the mode signal MODE indicates a power consumption reduction mode. The variable voltage may be a sine wave voltage or a cosine wave voltage. That is, the first step motor control signal OUT1 may indicate a DC voltage as the reference voltage in the normal mode and the sine wave voltage as the reference voltage in the power consumption reduction mode. Likewise, the second step motor control signal OUT2 may indicate the DC voltage as the reference voltage in the normal mode and the cosine wave voltage as the reference voltage in the power consumption reduction mode.

The gain controller 530 may output the control signal CON in response to a mode signal MODE and a gain control signal GCS. The control signal CON may include information on the amplitude of the variable voltage. The mode signal MODE may indicate the power consumption reduction mode when the step motor error signal ERROR falls within an offset and indicate the normal mode when the step motor error signal ERROR falls outside the offset. The first and second DAC signals DAC1 and DAC2 may include information on the location of an object in 2-dimensional space to be moved using a step motor.

A method of generating the step motor control signal may be derived from the description of the step motor control signal illustrated in FIGS. 4 and 5.

The method of generating the step motor control signal may include determination of a reference voltage of the step motor control signal and generation of the step motor control signal.

The reference voltage of the step motor control signal for operating the step motor may be determined as a fixed voltage when the step motor is operated in the normal mode and as a variable voltage when the step motor is operated in the power consumption reduction mode. The step motor control signal may be generated based on the determined reference voltage.

Two step motor control signals OUT1 and OUT2 may be pulse trains where a fixed voltage is the reference voltage when the mode signal MODE indicates the normal mode and where a variable voltage is the reference voltage when the mode signal MODE indicates the power consumption reduction mode.

The method of generating the step motor control signal may further include selection of the power consumption reduction mode when the step motor error signal ERROR falls within the offset and selection of the normal mode when the step motor error signal ERROR falls outside the offset.

The step motor error signal ERROR may be a differential signal including information on a difference between a current location of the object to be moved by the step motor and a movement location of the object. Alternately, the step motor error signal ERROR may be a signal that includes information on the movement of the object and may be generated using the differential signal.

The fixed voltage may be a predetermined DC voltage. The variable voltage may be the sine wave voltage or cosine wave voltage. The first step motor control signal OUT1 may be a pulse train in which the DC voltage or the sine wave voltage is the reference voltage, and the second step motor control signal OUT2 may be a pulse train in which the DC voltage or the cosine wave voltage is the reference voltage.

According to the step motor control circuit and the method of generating the step motor control signal of the present invention, the reference voltage of the step motor control signal in the form of the pulse train may be a sine wave voltage so as to reduce power consumption, thereby reducing the size or amplitude of the pulse train. Thus the step motor and the step motor driving circuit may be operated using the pulse train without electrical and mechanical difficulties.

Exemplary embodiments of the present invention have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A step motor control circuit, comprising:
    a DAC signal generator configured to generate first and second DAC signals in response to a step motor error signal;
    a gain adjust block configured to control gains of the first and second DAC signals in response to a control signal and configured to output first and second step motor control signals; and
    a gain controller configured to output the control signal in response to a mode signal and a gain control signal,
    wherein the first and second step motor control signals are pulse trains each including a reference voltage, wherein the reference voltage is a fixed voltage when the mode signal indicates a normal mode and the reference voltage is a variable voltage when the mode signal indicates a power consumption reduction mode.

2. The step motor control circuit as claimed in claim 1, wherein:
    the fixed voltage is a predetermined DC voltage and the variable voltage is a voltage in the form of a sine wave or a cosine wave,
    the first step motor control signal includes a reference voltage that is the predetermined DC voltage or the voltage in the form of the sine wave, and
    the second step motor control signal includes a reference voltage that is the predetermined DC voltage or the voltage in the form of the cosine wave.

3. The step motor control circuit as claimed in claim 1, wherein the step motor error signal is a differential signal including information on a difference between a current location of a moving object by a step motor and a movement location of the object to be moved, or the step motor error signal is a signal including information on the movement of the object and generated using the differential signal.

4. The step motor control circuit as claimed in claim 1, wherein the mode signal indicates the power consumption reduction mode when the step motor error signal falls within an offset and indicates the normal mode when the step motor error signal falls outside the offset.

5. The step motor control circuit as claimed in claim 1, wherein the first and second DAC signals include information on the location of the object in a 2-dimensional space to be moved using the step motor.

6. The step motor control circuit as claimed in claim 1, wherein the DAC signal generator includes look-up tables, the look-up tables including information on the first and second DAC signals, wherein the DAC signal generator is configured to obtain information on the step motor error signal from the look-up tables and generate the first and second DAC signals based on the obtained information.

7. The step motor control circuit as claimed in claim 6, wherein the look-up tables include:
    a first look-up table including information on the first DAC signal; and
    a second look-up table including information on the second DAC signal.

8. The step motor control circuit as claimed in claim 1, wherein the gain control block includes:
    a first gain stage configured to control the gain of the first DAC signal in response to the control signal and output the first step motor control signal; and
    a second gain stage configured to control the gain of the second DAC signal in response to the control signal and output the second step motor control signal.

9. The step motor control circuit as claimed in claim 8, wherein the control of the gain of the first DAC signal is controlling an amplitude of a sine wave based on the first DAC signal, and the control of the gain of the second DAC signal is controlling an amplitude of a cosine wave based on the second DAC signal.

10. The step motor control circuit as claimed in claim 8, wherein the gain control signal includes information for controlling the gain of the first and second DAC signals.

11. A step motor control circuit, comprising:
    a step motor control signal generator configured to generate first and second step motor control signals in response to a step motor error signal and a control signal; and
    a gain controller configured to output the control signal in response to a mode signal and a gain control signal,
    wherein the first and second step motor control signals are pulse trains including a reference voltage, wherein the reference voltage is a fixed voltage when the mode signal indicates a normal mode and the reference voltage is a variable voltage when the mode signal indicates a power consumption reduction mode.

12. The step motor control circuit as claimed in claim 11, wherein: the
    fixed voltage is a predetermined DC voltage, and the variable voltage is a voltage in the form of a sine wave or a cosine wave, the first step motor control signal includes a reference voltage that is the predetermined DC voltage or the voltage in the form of the sine wave, and the second step motor control signal includes a reference voltage that is the predetermined DC voltage or the voltage in the form of the cosine wave.

13. The step motor control circuit as claimed in claim 11, wherein the step motor error signal is a differential signal including information on a difference between a current location of a moving object by a step motor and a movement location of the object to be moved, or the step motor error signal is a signal including information on the movement of the object and generated using the different signal.

14. The step motor control circuit as claimed in claim 11, wherein the mode signal indicates the power consumption reduction mode when the step motor error signal falls within an offset and indicates the normal mode when the step motor error signal falls outside the offset.

15. The step motor control circuit as claimed in claim 11, wherein the first and second step motor control signals include information on the location of the object in a 2-dimensional space to be moved using the step motor.

16. The step motor control circuit as claimed in claim 11, wherein the step motor control signal generator includes look-up tables, the look-up tables including information on the first and second step motor control signals, wherein the step motor control signal generator is configured to obtain information on the step motor error signal from the look-up tables and generate the first and second step motor control signals based on the obtained information.

17. The step motor control circuit as claimed in claim 16, wherein the look-up tables include:

a first look-up table that includes information on the first step motor control signal; and a second look-up table that includes information on the second step motor control signal.

18. The step motor control circuit as claimed in claim 16, wherein the gain control signal includes information on the amplitude of the variable voltage.

19. A method of generating a step motor control signal, comprising:

determining a reference voltage motor as a fixed voltage when the step motor is operated in a normal mode, and determining the reference voltage of the step motor control signal as a variable voltage when the step motor is operated in a power consumption reduction mode;

generating first and second step motor control that are pulse trains, wherein the first and second step motor control signals each include a determined reference voltage;

selecting the power consumption reduction mode when the step motor error signal falls within an offset; and selecting the normal mode when the step motor error signal falls outside the offset, wherein the step motor error signal is a differential signal including information on a difference between a current location of a moving object by a step motor and a movement location of the object to be moved, or the step motor error signal is a signal including information on the movement of the object and generated using the differential signal.

20. The method as claimed in claim 19, wherein:

the fixed voltage is a predetermined DC voltage and the variable voltage is a voltage in the form of a sine wave or a cosine wave, the first step motor control signal is a pulse train that includes a reference voltage that is the predetermined DC voltage or the voltage in the form of the sine wave, and the second step motor control signal is a pulse train that includes a reference voltage that is the predetermined DC voltage or the voltage in the form of the cosine wave.

* * * * *